US012601818B2

(12) United States Patent　　(10) Patent No.: US 12,601,818 B2
Shinoda et al.　　　　　　　　　(45) Date of Patent: Apr. 14, 2026

(54) ULTRASOUND DEVICE, IMPEDANCE MATCHING LAYER, AND ELECTROSTATIC DRIVE DEVICE

(71) Applicant: THE UNIVERSITY OF TOKYO, Tokyo (JP)

(72) Inventors: Hiroyuki Shinoda, Tokyo (JP); Takaaki Kamigaki, Tokyo (JP); Yuki Ninomiya, Tokyo (JP)

(73) Assignee: THE UNIVERSITY OF TOKYO (JP)

( * ) Notice: Subject to any disclaimer, the term of this patent is extended or adjusted under 35 U.S.C. 154(b) by 302 days.

(21) Appl. No.: 18/270,342

(22) PCT Filed: Dec. 23, 2021

(86) PCT No.: PCT/JP2021/048057

§ 371 (c)(1),
(2) Date: Jun. 29, 2023

(87) PCT Pub. No.: WO2022/149486

PCT Pub. Date: Jul. 14, 2022

(65) Prior Publication Data

US 2024/0085544 A1　　Mar. 14, 2024

(30) Foreign Application Priority Data

Jan. 6, 2021　(JP) ................................ 2021-000922

(51) Int. Cl.
G01S 7/52　　　(2006.01)
G01N 29/22　　(2006.01)
(Continued)

(52) U.S. Cl.
CPC ...... G01S 7/52019 (2013.01); G01S 7/52079 (2013.01); *G01N 29/221* (2013.01);
(Continued)

(58) Field of Classification Search
CPC ............ G01S 7/52019; G01S 7/52079; G01N 2291/044; G01N 2291/106; G01N 29/221; G10K 11/32
(Continued)

(56) References Cited

U.S. PATENT DOCUMENTS 5,272,758 A * 12/1993 Isogami ............... H04R 19/016
　　　　　　　　　　　　　　　　　　　　　381/174
9,061,131 B2 * 6/2015 Jahnke ...................... A61B 8/12
2013/0060140 A1 * 3/2013 Sinelnikov ............... A61N 7/02
　　　　　　　　　　　　　　　　　　　　　600/439

FOREIGN PATENT DOCUMENTS

EP　　　1132149 A2 * 9/2001 ............. B06B 1/067
EP　　　2000222 A2 * 12/2008 ............. B06B 1/067
(Continued)

OTHER PUBLICATIONS

Takaaki Kamigaki, Yuki Ninomiya, Hiroyuki Shinoda: Development of an electrostatically driven aerial ultrasonic transducer with high efficiency and high power, Transactions of the Society of Instrument and Control Engineers, vol. 54, No. 3, pp. 340-345, 2018 (Year: 2018).*
(Continued)

*Primary Examiner* — Stephanie E Bloss
*Assistant Examiner* — Kevin C Butler
(74) *Attorney, Agent, or Firm* — Harness, Dickey & Pierce, P.L.C.

(57)　　　　　　ABSTRACT

An ultrasonic device is provided for transmitting ultrasonic waves. The ultrasonic device comprises an electrostatic drive device and an impedance matching layer. The electrostatic drive device includes a first electrode and a second electrode. The first electrode is a drive membrane and is disposed with tension applied at a position facing the second electrode. The second electrode has a through hole. At least one of the first electrode and the second electrode is a
(Continued)

laminated membrane in which a plurality of materials with different conductivities are laminated. The impedance matching layer includes a matching membrane and gas. The matching membrane has a resonance loss equal to or less than transmitted acoustic power, and is disposed with tension applied at a position facing the first electrode. The gas is sealed between the matching membrane and the first electrode.

10 Claims, 4 Drawing Sheets

(51) Int. Cl.
G01N 29/24 (2006.01)
G10K 11/32 (2006.01)

(52) U.S. Cl.
CPC ....... *G01N 29/24* (2013.01); *G01N 2291/044* (2013.01); *G01N 2291/106* (2013.01); *G10K 11/32* (2013.01)

(58) Field of Classification Search
USPC .......................................................... 73/641
See application file for complete search history.

(56) References Cited

FOREIGN PATENT DOCUMENTS

| | | | | | |
|---|---|---|---|---|---|
| JP | 54073618 | A | * | 6/1979 | ............ H04R 19/00 |
| JP | S54-073618 | A | | 6/1979 | |
| JP | H0523698 | U | | 3/1993 | |
| JP | 2577209 | Y2 | * | 7/1998 | |
| JP | 2001346296 | A | * | 12/2001 | |
| JP | 3294496 | B2 | * | 6/2002 | |
| JP | 3345844 | B2 | * | 11/2002 | |
| JP | 2003102095 | A | * | 4/2003 | |
| JP | 2007104371 | A | * | 4/2007 | |
| JP | 2011101163 | A | * | 5/2011 | |
| JP | 2014033301 | A | * | 2/2014 | |
| JP | 5475070 | B2 | * | 4/2014 | |
| JP | 2018037863 | A | * | 3/2018 | |
| JP | 2019029862 | A | * | 2/2019 | |
| JP | 2024137007 | A | * | 10/2024 | ............ H04R 17/00 |
| RU | 2418384 | C2 | * | 5/2011 | ............ G10K 11/02 |
| TW | 1791376 | B | * | 2/2023 | ........... A61B 8/4281 |

OTHER PUBLICATIONS

Takaaki Kamigaki, Yuki Ninomiya, and Hiroyuki Shinoda, "Electrostatically Driven Airborne Ultrasound Transmitter with Fine Mesh Electrode," in Proc. 2018 International Flexible Electronics Technology Conference (IFETC), pp. 1-3, Aug. 7-9, 2018, Ottawa, Canada (Year: 2018).*

Takaaki Kamigaki, and Hiroyuki Shinoda, "Driving Circuit Design for Electrostatic Ultrasonic Transmitter," in Proc. 2019 IEEE International Ultrasonics Symposium (IUS), MoPoS-31.3, Oct. 6-9, 2019, Glasgow, Scotland (Year: 2019).*

Kamigaki Takaaki Kamigaki et al. Electrostatically Driven Airborne Ultrasound Transducer with Perforated Backplate for Nonlinear Acoustic Applications. Proc. of the 23rd International Congress on Acoustics. Sep. 13, 2019, pp. 6363-6369, particularly, "3. Proposed Transducer" (Year: 2019).*

Y. Ninomiya, T. Kamigaki and H. Shinoda, "Airborne Ultrasonic E mission Based on Asymmetric Vibration," 2020 IEEE International Ultrasonics Symposium (IUS), Las Vegas, NV, USA, 2020, pp. 1-3, doi: 10.1 109/IUS46767.2020.9251688 (Year: 2020).*

Toda, Narrowband Impedance Matching Layer for High Efficiency Thickness Mode Ultrasonic Transducers, IEEE transactions on ultrasonics, ferroelectrics, and frequency control, vol. 49, No. 3, Mar. 2002, pp. 299-306 (Year: 2002).*

Takaaki Kamigaki, Yuki Ninomiya, Hiroyuki Shinoda: Development of an electrostatically driven aerial ultrasonic transducer with high efficiency and high power, Transactions of the Society of Instrument and Control Engineers, vol. 54, No. 3, pp. 340-345, 2018.

Takaaki Kamigaki, Yuki Ninomiya, and Hiroyuki Shinoda, "Electrostatically Driven Airborne Ultrasound Transmitter with Fine Mesh Electrode," in Proc. 2018 International Flexible Electronics Technology Conference (IFETC), pp. 1-3, Aug. 7-9, 2018, Ottawa, Canada.

Takaaki Kamigaki, and Hiroyuki Shinoda, "Driving Circuit Design for Electrostatic Ultrasonic Transmitter," in Proc. 2019 IEEE International Ultrasonics Symposium (IUS), MoPoS-31.3, Oct. 6-9, 2019, Glasgow, Scotland.

Kamigaki Takaaki Kamigaki et al. Electrostatically Driven Airborne Ultrasound Transducer with Perforated Backplate for Nonlinear Acoustic Applications. Proc. of the 23rd International Congress on Acoustics. Sep. 13, 2019, pp. 6363-6369, particularly, "3. Proposed Transducer".

Y. Ninomiya, T. Kamigaki and H. Shinoda, "Airborne Ultrasonic E mission Based on Asymmetric Vibration," 2020 IEEE International Ultrasonics Symposium (IUS), Las Vegas, NV, USA, 2020, pp. 1-3, doi: 10.1 109/IUS46767.2020.9251688.

International Search Report issued in PCT/JP2021/048057, mailed Feb. 15, 2022; ISA/JP (5 pages).

* cited by examiner

ULTRASOUND DEVICE, IMPEDANCE MATCHING LAYER, AND ELECTROSTATIC DRIVE DEVICE

CROSS REFERENCE TO RELATED APPLICATIONS

This application is a U.S. National Phase application under 35 U.S.C. 371 of International Application No. PCT/JP2021/048057, filed on Dec. 23, 2021, which claims priority to Japanese Patent Application No. 2021-000922, filed on Jan. 6, 2021. The entire disclosures of the above applications are expressly incorporated by reference herein.

BACKGROUND

The present invention relates to an ultrasonic device, an impedance matching layer, and an electrostatic drive device.

RELATED ART

Airborne ultrasound phased array (AUPA), which can generate powerful airborne ultrasound, has been used for various measurements and parametric speakers. In recent years, AUPA has also been considered for a wide range of applications, including airborne haptic, levitation of small or lightweight object, and airflow control. For this purpose, a highly efficient ultrasonic device has been proposed (see Patent Documents 1 and 2, and Non-Patent Documents 1 to 5).

PRIOR ART DOCUMENTS

Patent Documents

[Patent Document 1] JP 2019-029862 A
[Patent Document 2] JP 2018-037863 A

Non-Patent Documents

[Non-Patent Document 1] Takaaki Kamigaki, Yuki Ninomiya, and Hiroyuki Shinoda, "Developing Electrostatically Driven Ultrasound Transducer with High Sound Intensity and High Energy Conversion Efficiency," Transactions of the Society of Instrument and Control Engineers, Vol. 54, No. 3, pp. 340-345, 2018.
[Non-Patent Document 2] Takaaki Kamigaki, Yuki Ninomiya, and Hiroyuki Shinoda, "Electrostatically Driven Airborne Ultrasound Transmitter with Fine Mesh Electrode," in Proc. 2018 International Flexible Electronics Technology Conference (IFETC), pp. 1-3, Aug. 7-9, 2018, Ottawa, Canada.
[Non-Patent Document 3] Takaaki Kamigaki, and Hiroyuki Shinoda, "Driving Circuit Design for Electrostatic Ultrasonic Transmitter," in Proc. 2019 IEEE International Ultrasonics Symposium (IUS), MoPoS-31.3, Oct. 6-9, 2019, Glasgow, Scotland.
[Non-Patent Document 4] Takaaki Kamigaki, Yuki Ninomiya, and Hiroyuki Shinoda, "Electrostatically Driven Airborne Ultrasound Transducer with Perforated Backplate for Nonlinear Acoustic Applications," 23rd International Congress on Acoustics (ICA2019), pp. 6363-6369, September 9-13, Aachen, Germany.
[Non-Patent Document 5] Y. Ninomiya, T. Kamigaki and H. Shinoda, "Airborne Ultrasonic Emission Based on Asymmetric Vibration," 2020 IEEE International Ultrasonics Symposium (IUS), Las Vegas, NV, USA, 2020, pp. 1-3, doi: 10.1109/IUS46767.2020.9251688.

If a highly efficient sheet-shaped transducer can be realized, an ultrasonic device can be easily incorporated into existing device and laid out in limited space such as inside a car and room, making it possible to use them in daily life and incorporate them into various infrastructures.

In view of the above circumstances, the present invention provides an ultrasonic device, an impedance matching layer and an electrostatic drive device to realize a sheet-shaped aerial ultrasonic device that can be made transparent with high output and high efficiency.

SUMMARY

According to an aspect of the present invention, an ultrasonic device for transmitting ultrasonic wave is provided. The ultrasonic device comprises an electrostatic drive device and an impedance matching layer. The electrostatic drive device includes a first electrode and a second electrode. The first electrode is a drive membrane and is disposed with tension applied at a position facing the second electrode. The second electrode has a through hole. At least one of the first electrode and the second electrode is a laminated membrane in which a plurality of materials with different conductivities are laminated. The impedance matching layer includes a matching membrane and gas. The matching membrane has a resonance loss equal to or less than transmitted acoustic power, and is disposed with tension applied at a position facing the first electrode. The gas is sealed between the matching membrane and the first electrode. A distance between a surface of the matching membrane facing the first electrode and a surface of the first electrode facing the matching membrane is a value according to an amplitude amplification factor, which is a ratio of an amplitude of the drive membrane to an amplitude of the matching membrane.

According to one aspect of the present invention, it is possible to provide an ultrasonic device with high power and high efficiency.

BRIEF DESCRIPTION OF THE DRAWINGS

FIG. 2 shows a configuration example of an electrostatic drive device 2.

FIG. 3 shows a configuration example of an electrostatic drive device 2.

DETAILED DESCRIPTION

Hereinafter, an embodiment of the present invention will be described with reference to drawings. Various features described in the embodiment below can be combined with each other.

1. Configuration of Ultrasonic Device

Figure 1:
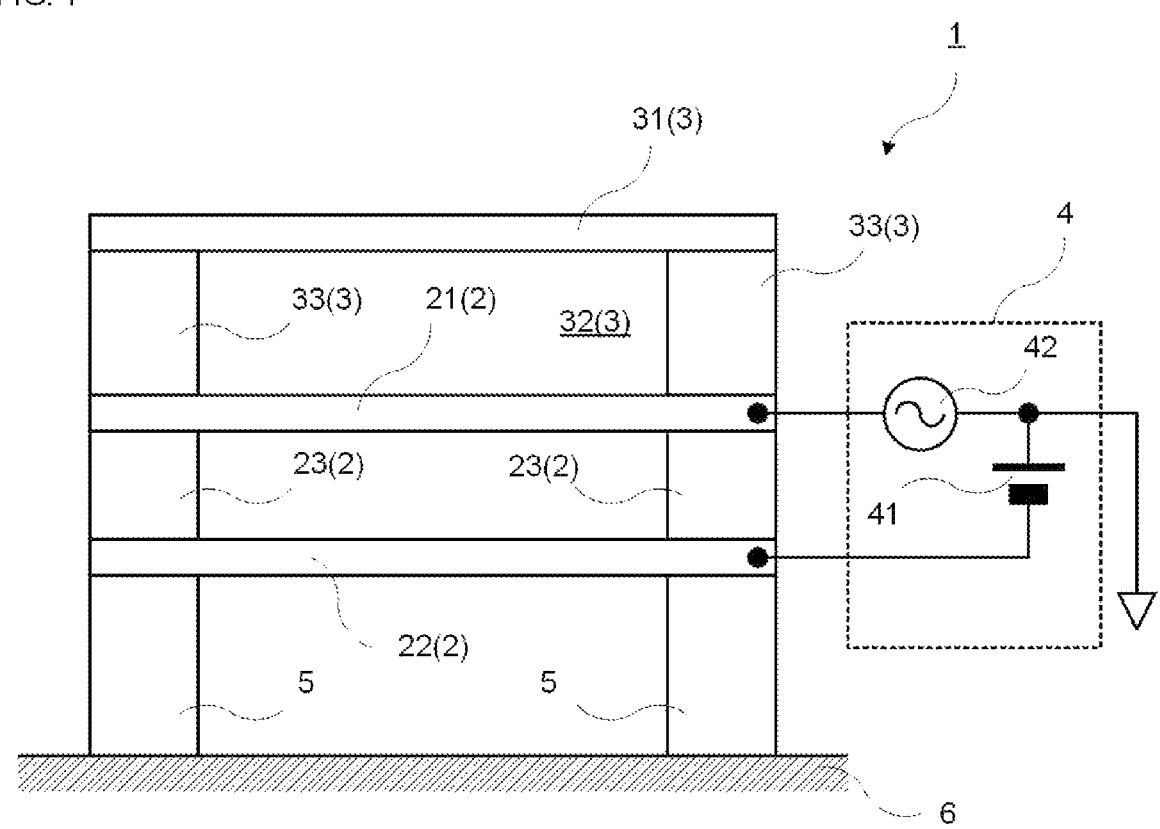
FIG. 1 shows a configuration example of an ultrasonic device according to an embodiment of the present invention.

FIG. 1 shows a configuration example of an ultrasonic device according to an embodiment of the present invention. As shown in the drawing, an ultrasonic device 1 comprises an electrostatic drive device 2, an impedance matching layer 3, and a power supply 4. The ultrasonic device 1 is a device for transmitting ultrasonic wave into air or the like.

The electrostatic drive device 2 comprises a first electrode 21 and a second electrode 22. The first electrode 21 is a drive membrane and is disposed with tension applied at a position facing the second electrode 22. The second electrode 22 includes a through hole. At least one of the first electrode 21 and the second electrode 22 is a laminated membrane in which a plurality of materials with different conductivity are laminated. Specifically, the first electrode 21 may be configured of a conductor and the second electrode 22 may be configured of a laminated membrane, the first electrode 21 may be configured of a laminated membrane and the second electrode 22 may be configured of a conductor, or both the first electrode 21 and the second electrode 22 may be configured of laminated membrane. It is also possible to apply different laminated membranes for the first electrode 21 and the second electrode 22, for example, one is a two-layer laminated membrane configured of a conductor and an insulator, and the other is a three-layer laminated membrane configured of a conductor, an insulator and a conductor.

The electrostatic drive device 2 is provided on a spacer 5 on a substrate 6, the second electrode 22 is provided on the substrate 6 side and the first electrode 21 is provided via the spacer 23. The substrate 6 is configured of, for instance, an acrylic plate or a circuit board, and the spacer 5 and the spacer 23 are configured of, for instance, polyimide. Details of the electrostatic drive device 2 will be described later.

The impedance matching layer 3 comprises a matching membrane 31 and gas 32. The matching membrane 31 has a resonance loss equal to or less than transmitted acoustic power, and is disposed with tension applied at a position facing the first electrode 21. The gas 32 is sealed between the matching membrane 31 and the first electrode 21. A distance between a surface of the matching membrane 31 facing the first electrode 21 and a surface of the first electrode facing the matching membrane is a value according to an amplitude amplification factor, which is a ratio of an amplitude of the drive membrane to an amplitude of the matching membrane.

The impedance matching layer 3 has a configuration in which the matching membrane 31 is provided via the spacer 33 provided on the electrostatic drive device 2. The spacer 33 is configured of, for instance, polyimide. Details of the impedance matching layer 3 will be described later.

A power supply 4 is a combination of a DC power supply 41 and an AC power supply 42, whereby voltage of the AC power supply 42 is biased by voltage of the DC power supply 41, i.e., voltage oscillating with the same polarity is applied between the first electrode 21 and the second electrode 22.

2. Configuration of Electrostatic Drive Device

Figure 2:
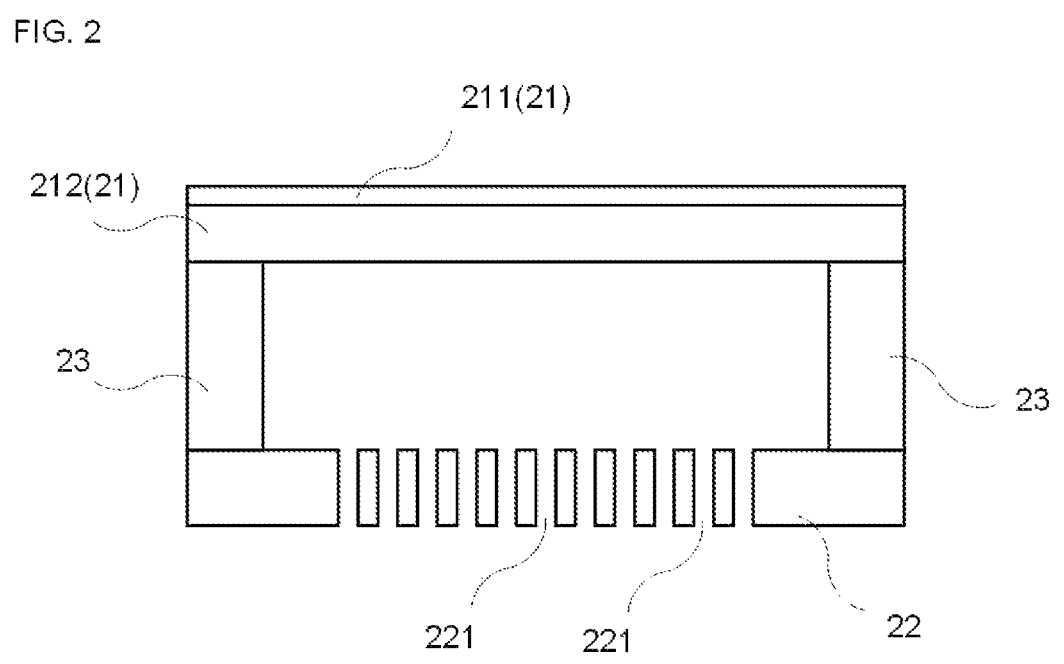
Figure 3:
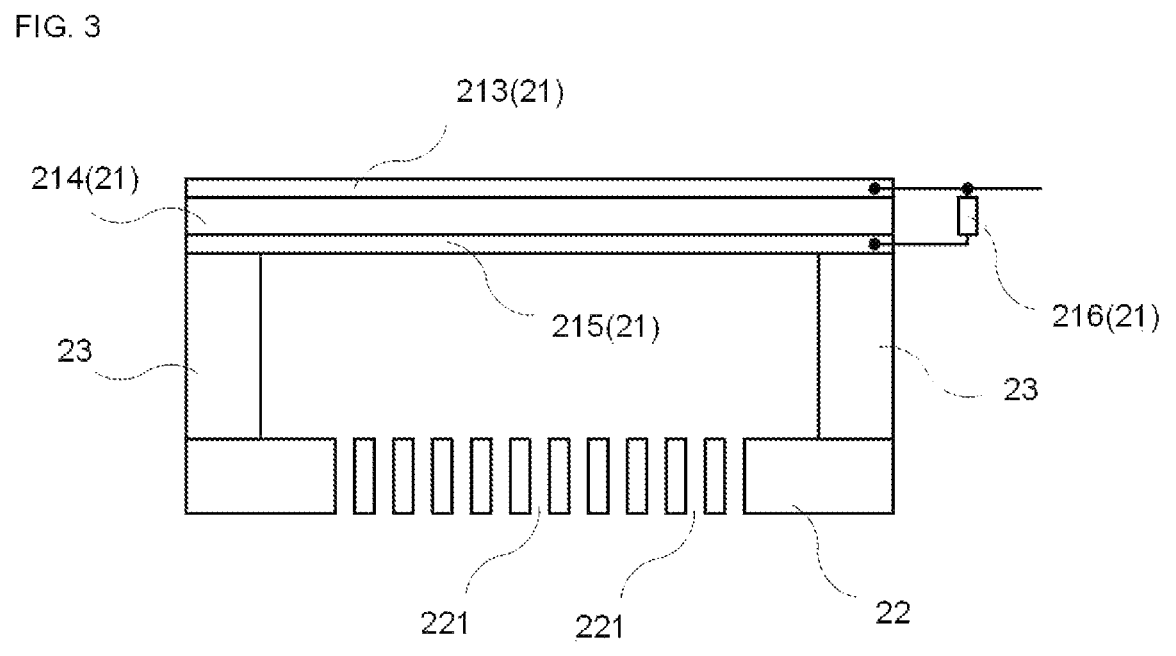
Figure 4:
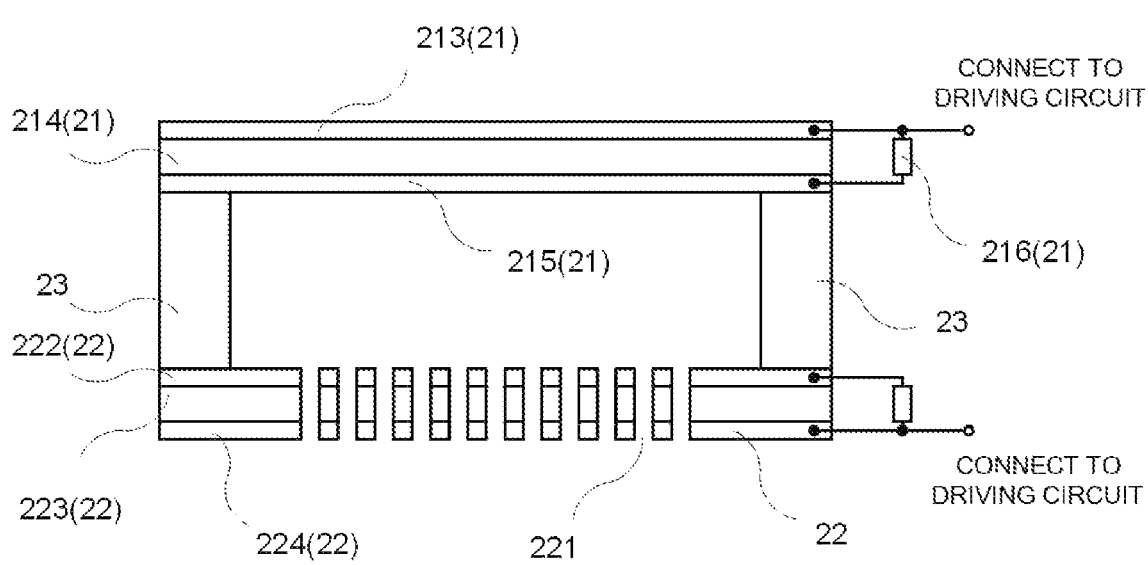
FIG. 4 shows a configuration example of an electrostatic drive device 2.

FIGS. 2 to 4 show configuration examples of the electrostatic drive device 2. As shown in FIG. 2, the electrostatic drive device 2 comprises the first electrode 21 and the second electrode 22. The first electrode 21 operates (vibrates) as a drive membrane, is formed by laminating a plurality of materials having different conductivities, and is disposed with tension applied at a position facing the second electrode 22. Specifically, the first electrode 21 is laminated with a first layer 211 and a second layer 212, and the second layer 212 is disposed at a position facing the second electrode 22. Conductivity of the second layer 212 is less than that of the first layer 211. For instance, by making the first layer 211 a conductor and the second layer 212 an insulator, a condition that the conductivity of the second layer 212 is less than that of the first layer 211 can be met. The second layer 212 does not need to be an insulator, and may be a conductor with sufficiently high resistance.

The tension is applied to resonate at a desired resonance frequency and to suppress a pull-in phenomenon. The pull-in phenomenon is a common problem in an electrostatic actuator and is a phenomenon in which a drive membrane sticks to a lower electrode and cannot operate. This is due to imbalance of force applied to the vibration membrane when the drive membrane is displaced, that is, imbalance between electrostatic force and restoring force due to membrane stiffness. When a parallel plate structure is driven with constant voltage, this phenomenon occurs when displacement exceeds $\frac{1}{3}$ of an initial gap. In a typical parallel plate structure, the drive membrane is allowed to operate so as not to exceed the displacement.

The second electrode 22 comprises a through hole 221. The through hole 221 is provided for suppressing a reactance component due to gas existing between the first electrode 21 and the second electrode 22. In other words, the through hole 221 is provided for allowing gas existing between the first electrode 21 and the second electrode 22 to freely enter and exit through the through hole 221 when the first electrode 21, which is the drive membrane, vibrates. Although at least one of the first electrode and the second electrode is a laminated membrane in which a plurality of materials having different conductivity are laminated, the case where the first electrode is a laminated membrane will be described here. As for a combination of the first electrode 21 and the second electrode 22, the first electrode 21 may be configured of a conductor and the second electrode 22 may be configured of a laminated membrane, the first electrode 21 may be configured of a laminated membrane and the second electrode 22 may be configured of a conductor, or both the first electrode 21 and the second electrode 22 are configured of laminated membrane. It is also possible to apply different laminated membranes for the first electrode 21 and the second electrode 22, for instance, one is a two-layer laminated membrane configured of a conductor and an insulator, and the other is a three-layer laminated membrane configured of a conductor, an insulator and a conductor.

As shown in FIG. 3, the first electrode 21 can be calibrated in such a manner that a first layer 213, a second layer 214, and a third layer 215 are laminated in sequence. In this case, the third layer 215 is disposed at a position facing the second electrode 22. In this case, tension is applied to the first electrode 21. The first layer 213 and the third layer 215 are electrically connected. This prevents permanent adhesion of charge to a surface of the second layer 214 when the electrostatic drive device 2 is operated. The second layer 214 is, for instance, an insulator, and bias voltage by the DC power supply 41 is effectively reduced when charge adheres to the insulator.

Conductivity of the second layer 214 is less than conductivity of the first layer 213, conductivity of the third layer 215 is equal to or less than conductivity of the first layer 213 and is greater than conductivity of the second layer 214. Specifically, the first layer 213 is a first conductor, the second layer 214 is an insulator, and the third layer 215 is a second conductor.

The first conductor (the first layer 213) and the second conductor (the third layer 215) are connected via electrical resistance 216. With such a configuration, even if the first electrode 21 and the second electrode 22 come into contact with each other when the electrostatic drive device 2 is operated, for a reason such as the electrostatic drive device 2 being compressed, a theoretically infinite short-circuit current does not flow, and only a current limited by the electrical resistance 216 flows, thus a large current 2 can be presented from flowing through the electrostatic drive device. Of course, even when the electrical resistance 216 is connected, permanent adhesion of charge to a surface of the second layer 214 can be prevented.

It is also possible to omit the electrical resistance 216, i.e., not to connect the electrical resistance 216, by making the first layer 213 a first conductor, the second layer 214 an insulator, and the third layer 215 a second conductor, with resistance of the second conductor higher than that of the first conductor. Of course, it is possible to connect the electrical resistance 216. Further, same effect can be achieved by omitting the third layer 215 and giving the insulator of the second layer 214 a slight conductivity.

Further, as shown in FIG. 4, it is also possible to achieve the same effect by letting the second electrode 22 having a configuration in which a first conductor 222, an insulator 223, and a second conductor 224 are laminated in sequence, and electrically connecting the first conductor 222 and the second conductor 224.

As shown in FIGS. 2 to 4, the second electrode 22 comprises a through hole 221. The through hole 221 is provided for suppressing a reactance component due to gas existing between the first electrode 21 and the second electrode 22. In other words, the through hole 221 is provided for allowing the gas existing between the first electrode 21 and the second electrode 22 to freely enter and exit through the through hole 221 when the first electrode 21, which is the drive membrane, vibrates.

A distance between the first electrode 21 and the second electrode 22 is a maximum value obtained by dividing a square of a discharge voltage by the distance, the discharge voltage being a discharge occurring between the first electrode 21 and the second electrode 22. Specifically, if the distance between the first electrode 21 and the second electrode 22 is $D_d$, discharge voltage V can be represented as $V=(D_d)$ as a function of $D_d$. In this case, electrostatic force p per unit area is $p=\varepsilon\alpha V^2/(2D_d^2)$. Here, $\varepsilon$ is dielectric constant of gas between the first electrode 21 and the second electrode 22, and $\alpha$ is conductor occupancy of the second electrode 22 with the through hole 221. If a maximum displacement s of the first electrode 21, which is a vibration membrane, is $s=rD_d$ (r is a constant smaller than 1), upper power limit W of the electrostatic drive device 2 is $W=psf=\varepsilon\alpha rfV^2/(2D_d)$. f is frequency. Since $\varepsilon\alpha rf/2$ is a constant, when maximizing the upper power limit W of the electrostatic drive device 2, $D_d$ that maximizes $V^2/D_d$ shall be determined.

It is also possible to further suppress discharge between the first electrode 21 and the second electrode 22 by allowing gas having a property that electrical discharge is less likely to occur than air, for instance, sulfur hexafluoride ($SF_6$), to be filled between the first electrode 21 and the second electrode 22. This can increase the discharge voltage V and thus increase the upper power limit W.

Furthermore, it is desirable to separate the first electrode into units, and to set size of each unit in such a manner that resonance frequency of the first electrode 21 has a value corresponding to drive frequency. Specifically, the size of each unit is desirably to be determined in such a manner that the resonance frequency of the first electrode 21 is close to drive frequency.

3. Configuration of Impedance Matching Layer

As shown in FIG. 1, the impedance matching layer 3 comprises the matching membrane 31 and the gas 32. The impedance matching layer 3 is provided with the matching membrane 31 via the spacer 33 on the electrostatic drive device 2. The impedance matching layer 3 can be used in combination with a drive device other than the electrostatic drive device 2.

The matching membrane 31 is disposed with tension applied at a position facing the vibration surface of the vibration device, for instance, a surface on the first layer 211 side of the first electrode 21 that is the vibration membrane of the electrostatic drive device 2. There is no opening exists in the matching membrane 31 and no opening exists on the vibration surface.

The matching membrane 31 has a resonance loss equal to or less than transmitted acoustic power. A real part of mechanical impedance of the matching membrane 31 alone, which represents the resonance loss of the matching membrane 31 alone, is a value obtained by dividing mass impedance of the matching membrane 31 by Q value of the matching membrane 31 alone. The mechanical impedance of the matching membrane 31 alone is a ratio of applied pressure to vibration velocity of membrane when the matching membrane 31 exists alone, and average value in the membrane is used as the vibration velocity and the applied pressure. Specifically, when surface density of the matching membrane 31 is $\sigma$ [kg/m$^2$], angular frequency is $\omega$ [rad/s], and the Q value of the matching membrane 31 alone is Q, $\sigma\omega/Q$ is equal to or less than intrinsic acoustic impedance $\rho c$ of air from which ultrasonic wave is transmitted. Considering electroacoustic conversion efficiency, it is desirable that $\sigma\omega/Q$ be sufficiently smaller than $\rho c$.

The gas 32 is sealed between the matching membrane 31 and the vibration surface, for instance, a surface on the first layer 211 side of the first electrode 21, which is the vibration membrane of the electrostatic drive device 2. The gas 32 is, for instance, air. A distance between a surface of the matching membrane 31 facing the vibration surface and the vibration surface, i.e., a distance $D_m$ between the matching membrane 31 and the vibration surface, is determined according to amplitude amplification factor, which is a ratio of an amplitude of the vibration surface to that of the matching membrane. Specifically, when k is represented by Equation 1, a condition for $D_m$ is that kL shown in Equation 2 is 5 or less. Preferably, the condition for $D_m$ is that kL is sufficiently less than 5. In the equation, gas viscosity is $\eta$ [Pa s], gas volume modulus is $\kappa$ [Pa], angular frequency is $\omega$ [rad/s], and size of the matching membrane 31 is L [m]. In other words, the distance $D_m$ is equal to or greater than a first value shown in Equation 3. The condition for the distance $D_m$ described here is based on viscous loss of the gas 32 and also indicates a condition under which the viscous loss does not pose a problem. Therefore, although the distance $D_m$ is determined according to the amplitude amplification factor, it is necessary to determine the amplitude amplification factor in such a manner that loss due to viscosity and heat conduction determined by the distance $D_m$ does not become excessive.

$$k = \frac{1}{D_m}\sqrt{\frac{12\eta}{\kappa}\omega} \qquad \text{[Equation 1]}$$

$$kL = \frac{L}{D_m}\sqrt{\frac{12\eta}{\kappa}\omega} \qquad \text{[Equation 2]}$$

$$\frac{L}{5}\sqrt{\frac{12\eta}{\kappa}\omega} \qquad \text{[Equation 3]}$$

The first value is a value obtained by multiplying a second value by length of the matching membrane 31 and dividing a result thereof by 5, the second value is a square root of a third value. The third value is a value obtained by multiplying a value obtained by dividing gas viscosity $\eta$ of the gas by bulk elastic modulus κ of gas, and multiplying a result thereof by 12 and an angular frequency ω at which the matching membrane is vibrated.

For instance, if L=2 mm and ω=2π×80 kHz, then $D_m$ is a value sufficiently greater than 10 μm.

4. Unit

Size L of the matching membrane 31 needs to be a size in such a manner that the lowest resonance frequency of the matching membrane 31 alone is less than the frequency at which the matching membrane 31 is vibrated. This is because reactance at the time of driving in the matching membrane 31 alone becomes mass (inducibility, positive reactance). Therefore, the matching membrane 31, the first electrode 21, and the second electrode 22 are set to predetermined size, and those fixed at these edge parts are used as units, and this units can be integrated in a plane direction to form an array. As for the unit, for instance, the matching membrane 31 or the like is circular with diameter of 2 mm.

5. Experimental Result

Experiment is conducted using parameters shown in Table 1. As a result, it can be confirmed that a target amplitude at 80 kHz is reached at 46.2 kHz and a predetermined amplitude amplification effect can be obtained by the impedance matching layer 3.

TABLE 1

| EACH PARAMETER | VALUE |
|---|---|
| FIRST LAYER 211 | 30 nm (PLATINUM) |
| SECOND LAYER 212 | 12.5 μm (POLYIMIDE) |
| DISTANCE BETWEEN FIRST ELECTRODE 21 AND SECOND ELECTRODE 22 (ESTIMATED) | 12.89 μm |
| EFFECTIVE AREA RATIO OF SECOND ELECTRODE 22 | 0.59 |
| RESONANCE FREQUENCY OF FIRST ELECTRODE 21 ALONE | 48 kHz |
| Q VALUE OF FIRST ELECTRODE 21 | 16 |
| MATCHING MEMBRANE 31 | 5 μm (POLYIMIDE) |
| DISTANCE BETWEEN MATCHING MEMBRANE 31 AND FIRST ELECTRODE 21 (ESTIMATED) | 359.09 μm |
| RESONANCE FREQUENCY OF MATCHING MEMBRANE 31 | 31.6 kHz |
| Q VALUE OF MATCHING MEMBRANE 31 | 15 |
| AMPLITUDE AMPLIFICATION FACTOR | 4.925 |

Q value of the first electrode 21 and Q value of the matching membrane 31 in Table 1 are both measured in air. Further, an amplitude amplification factor in Table 1 is a ratio of an amplitude of the matching membrane 31 to an amplitude of the drive membrane (the first electrode 21).

7. Others

The present invention may be provided in each of the following aspects.

An impedance matching layer, comprising: a matching membrane having a resonance loss equal to or less than transmitted acoustic power, and being disposed with tension applied at a position facing a vibration surface of a vibration device; and gas sealed between the matching membrane and the vibration surface; wherein a distance between a surface of the matching membrane facing the vibration surface and the vibration surface is a value according to an amplitude amplification factor which is a ratio of an amplitude of the vibration surface to an amplitude of the matching membrane.

The impedance matching layer, wherein: the distance is equal to or greater than a first value, the first value is a value obtained by multiplying a second value by length of the matching membrane and dividing a result thereof by 5, the second value is a square root of a third value, and the third value is a value obtained by dividing gas viscosity of the gas by bulk elastic modulus of the gas, and multiplying a result thereof by 12 and an angular frequency at which the matching membrane is vibrated.

The impedance matching layer, wherein: the matching membrane has a size in such a manner that a lowest order resonance frequency of the matching membrane alone is less than a frequency at which the matching membrane is vibrated.

An electrostatic drive device, comprising: a first electrode that is a drive membrane and is disposed with tension applied at a position facing a second electrode; and the second electrode having a through hole; wherein at least one of the first electrode and the second electrode is a laminated membrane in which a plurality of materials with different conductivities are laminated.

The electrostatic drive device, wherein: the laminated membrane is laminated with a first layer and a second layer, and the second layer is disposed at a position facing other electrode, conductivity of the second layer is less than conductivity of the first layer.

The electrostatic drive device, wherein: the laminated membrane is laminated with a first layer, a second layer, and a third layer in sequence, and the third layer is disposed at a position facing other electrode, conductivity of the second layer is less than conductivity of the first layer, conductivity of the third layer is equal to or less than conductivity of the first layer and greater than conductivity of the second layer, and the first layer and the third layer are electrically connected.

The electrostatic drive device, wherein: the first layer is a first conductor, the second layer is an insulator, the third layer is a second conductor, and resistance of the second conductor is greater than resistance of the first conductor.

The electrostatic drive device, wherein: the first layer is a first conductor, the second layer is an insulator, the third layer is a second conductor, and the first conductor and the second conductor are connected via electrical resistance.

The electrostatic drive device, wherein: the first electrode is separated into units, and size of the unit is a size at which a resonance frequency of the first electrode has a value corresponding to a drive frequency.

The electrostatic drive device, wherein: a distance between the first electrode and the second electrode is a maximum value obtained by dividing a square of a discharge voltage by the distance, the discharge voltage being a discharge occurring between the first electrode and the second electrode.

The electrostatic drive device, wherein: gas having a property that electrical discharge is less likely to occur than air is filled between the first electrode and the second electrode.

Of course, the present invention is not limited to the above aspects.

What is claimed is:

1. An ultrasonic device for transmitting ultrasonic wave, comprising:
   an electrostatic drive device including
      a first electrode that is a drive membrane and is disposed with tension applied at a position facing a second electrode, and the second electrode having a through hole, wherein at least one of the first electrode and the second electrode is a laminated membrane in which a plurality of materials with different conductivities are laminated; and an impedance matching layer including a matching membrane having a resonance loss equal to or less than transmitted acoustic power, and being disposed with tension applied at a position facing the first electrode, and gas sealed between the matching membrane and the first electrode, wherein a distance between a surface of the matching membrane facing the first electrode and a surface of the first electrode facing the matching membrane is a value according to an amplitude amplification factor which is a ratio of an amplitude of the drive membrane to an amplitude of the matching membrane.

2. An impedance matching layer, comprising:

a matching membrane having a resonance loss equal to or less than transmitted acoustic power, and being disposed with tension applied at a position facing a vibration surface of a vibration device; and gas sealed between the matching membrane and the vibration surface; wherein a distance between a surface of the matching membrane facing the vibration surface and the vibration surface is a value according to an amplitude amplification factor which is a ratio of an amplitude of the vibration surface to an amplitude of the matching membrane.

3. The impedance matching layer according to claim 2, wherein:

the distance is equal to or greater than a first value, the first value is a value obtained by multiplying a second value by length of the matching membrane and dividing a result thereof by 5, the second value is a square root of a third value, and the third value is a value obtained by dividing gas viscosity of the gas by bulk elastic modulus of the gas, and multiplying a result thereof by 12 and an angular frequency at which the matching membrane is vibrated.

4. The impedance matching layer according to claim 2, wherein:

the matching membrane has a size in such a manner that a lowest order resonance frequency of the matching membrane alone is less than a frequency at which the matching membrane is vibrated.

5. An electrostatic drive device, comprising:

a first electrode that is a drive membrane and is disposed with tension applied at a position facing a second electrode; and the second electrode having a through hole, wherein at least one of the first electrode and the second electrode is a laminated membrane in which a plurality of materials with different conductivities are laminated, the laminated membrane is laminated with a first layer, a second layer, and a third layer in sequence, and the third layer is disposed at a position facing the other of the first electrode and the second electrode, conductivity of the second layer is less than conductivity of the first layer, conductivity of the third layer is equal to or less than conductivity of the first layer and greater than conductivity of the second layer, and the first layer and the third layer are electrically connected.

6. The electrostatic drive device according to claim 5, wherein:

the first layer is a first conductor, the second layer is an insulator, the third layer is a second conductor, and resistance of the second conductor is greater than resistance of the first conductor.

7. The electrostatic drive device according to claim 5, wherein:

the first layer is a first conductor, the second layer is an insulator, the third layer is a second conductor, and the first conductor and the second conductor are connected via electrical resistance.

8. The electrostatic drive device according to claim 5, wherein:

the first electrode is separated into units, and size of the unit is a size at which a resonance frequency of the first electrode has a value corresponding to a drive frequency.

9. The electrostatic drive device according to claim 5, wherein:

a distance between the first electrode and the second electrode is a maximum value obtained by dividing a square of a discharge voltage by the distance, and the discharge voltage is a discharge occurring between the first electrode and the second electrode.

10. The electrostatic drive device according to claim 5, wherein:

gas having a property that electrical discharge is less likely to occur than air is filled between the first electrode and the second electrode.

* * * * *